(12) United States Patent
Dolinar et al.

(10) Patent No.: US 6,870,817 B2
(45) Date of Patent: Mar. 22, 2005

(54) METHOD AND APPARATUS FOR MONITORING CALLS OVER A SESSION INITIATION PROTOCOL NETWORK

(75) Inventors: Larry Dolinar, Richardson, TX (US); Mike Lyell, Garland, TX (US)

(73) Assignee: Nortel Networks Limited, St. Laurent ( * ) Notice: Subject to any disclaimer, the term of this patent is extended or adjusted under 35 U.S.C. 154(b) by 479 days.

(21) Appl. No.: 09/742,049

(22) Filed: Dec. 20, 2000

(65) Prior Publication Data

US 2002/0075880 A1 Jun. 20, 2002

(51) Int. Cl.[7] ............................................. G01R 31/08
(52) U.S. Cl. ...................................... 370/252; 709/224
(58) Field of Search ......................... 370/229, 230–236, 370/241–254, 351–353, 474–476; 709/224

(56) References Cited

U.S. PATENT DOCUMENTS 6,012,095 A * 1/2000 Thompson et al. ......... 709/231

2004/0008621 A1 * 1/2004 Yaker ......................... 370/221

* cited by examiner

*Primary Examiner*—David Vincent
(74) *Attorney, Agent, or Firm*—Garlick Harrison & Markison, LLP; James A. Harrison; Bruce E. Garlick

(57) ABSTRACT

An apparatus and method are formed to add a header to a data packet being transmitted into a data packet network for a communication that is to be monitored. The header causes the data packet to be routed to a specified system node that contains monitoring equipment. The specified system node then forwards the data packet to an exit node. The header is stripped prior to exiting the data packet network to a destination system or device so that there will be no indication that the call was monitored. In an alternate embodiment, a duplicate packet is created wherein one packet is routed to a specified destination for the communication while the other data packet is routed to a node containing monitoring equipment.

20 Claims, 7 Drawing Sheets

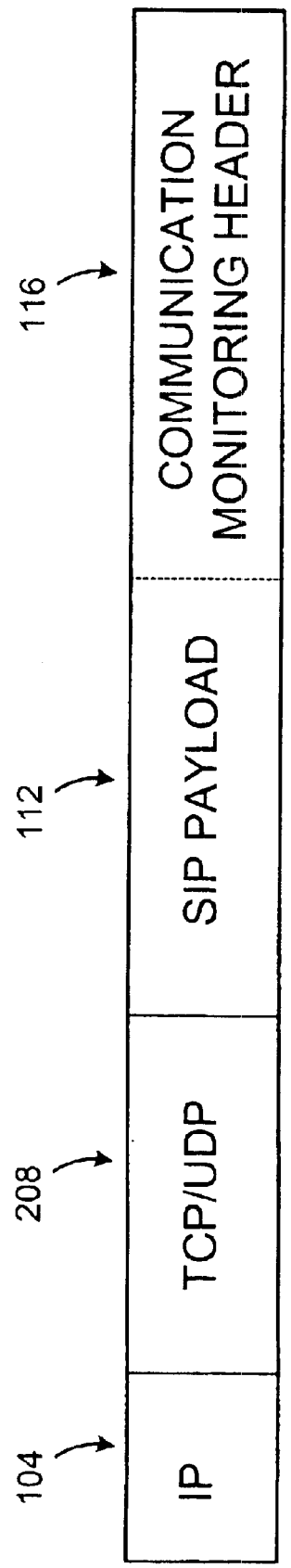
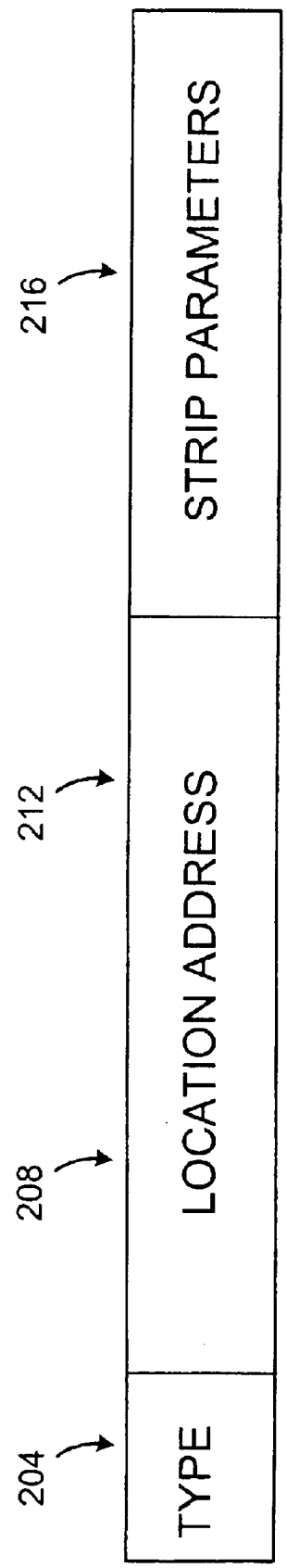

METHOD AND APPARATUS FOR MONITORING CALLS OVER A SESSION INITIATION PROTOCOL NETWORK

BACKGROUND

1. Technical Field

The present invention relates generally to communication networks, and more particularly, to Session Initiation Protocol networks for carrying calls over a data packet network.

2. Related Art

Traditional telephone networks including the Public Switched Telephone Network (PSTN) and Signaling System Number 7 (SS7) networks have provided closed systems that enabled users to achieve added capabilities beyond merely connecting a call. Initially, message storage capabilities such as those provided by answering machines and voice mail services (in SS7 networks) were popular. Since then, many other services have been developed as SS7 and other intelligent networks (IN and AIN) have gained widespread popularity. With the advent of Internet telephony, a need to provide voice and video mail services as well as traditional services has been realized.

During the past few years, Internet telephony has evolved from being a novelty for the technically oriented seeking party conversation material to a technology that, in the not too distant future, may largely replace the existing telephone networks. Supporting the widespread use of Internet telephony requires a host of standardized protocols to ensure transport audio and video data having a specified quality of service (QoS). These protocols are also needed to provide directory services and to enable signaling. Signaling protocols are of particular interest because they are the basis for advanced services such as mobility, universal numbers, multiparty conferencing, voice mail, and automatic call distribution.

Two signaling protocols that are being used to develop Internet telephony are the ITU-T H.323 suite of protocols and the Session Initiation Protocol (SIP) being developed by the Internet Engineering Task Force (IETF). SIP's strengths include its simplicity, scalability, extensibility, and modularity. As a result, increasing interest in SIP is being realized as the SIP standards and protocol requirements develope into maturity. The SIP Internet Standard proposal is documented in RFC 2543. RFC 2543 defines the setting up, control and tearing down sessions in the Internet. The defined SIP sessions include, but are not limited to, Internet telephone calls and multimedia conferences. They also define protocol requirements for Internet conferencing, telephony, presence, events notification and instant messaging.

Each SIP session may include different types of data including real time data such as audio and video. Currently, however, most of the SIP extensions address audio communication. As a traditional text-based Internet protocol, SIP resembles the hypertext transfer protocol (HTTP) and simple mail transfer protocol (SMTP). SIP uses Session Description Protocol (SDP) for media description. SIP, however, is independent of the packet layer. The protocol is an open standard and is scalable. Among SIP basic features, the protocol also enables personal mobility by providing the capability to reach a called party at a single, location-independent address.

SIP's basic architecture is client/server in nature. The main entities in SIP are the User Agent, the SIP Proxy Server, the SIP Redirect Server and the Registrar. In contrast to H.323, both SIP and H.323 support call routing, call signaling, capabilities exchange, media control, and supplementary services. SIP, however, in the view of many, is more scalable and provides greater flexibility and ease of implementation when building complex systems. H.323, on the other hand, has been widely used because of its manageability, reliability and inter-operability with the PSTN.

The User Agents, or SIP endpoints, function as clients (UACs) when initiating requests and as servers (UASs) when responding to requests. User Agents communicate with other User Agents directly or via an intermediate server. The User Agent also stores and manages call states.

SIP intermediate servers have the capability to behave as proxy or redirect servers. SIP Proxy Servers forward requests from the User Agent to the next SIP server, User Agent within the network and also retain information for billing/accounting purposes. SIP Redirect Servers respond to client requests and inform them of the requested server's address. Numerous hops can take place until reaching the final destination. SIP's tremendous flexibility allows the servers to contact external location servers to determine user or routing policies, and therefore, does not bind the user into only one scheme to locate users. In addition, to maintain scalability, the SIP servers can either maintain state information or forward requests in a stateless fashion.

The SIP registrar is the third entity of a SIP network. The SIP Registrar stores the registration information in a location service via a non-SIP protocol that is received in a registration message sent by the User Agent. Once the information is stored, the Registrar sends the appropriate response back to the user agent.

Generally, SIP is independent of the packet layer and only requires a datagram service. While SIP typically is used over UDP or TCP, it could, without technical changes, be run over IPX, frame relay, ATM AAL5 or X.25. SIP is designed to have a simple architecture and implementation. SIP's simplicity, however, doesn't compromise its power. It may also support encryption and authentication. SIP's client/server orientation offers a level of server-based call management missing in the peer call model that most H.323 endpoints use. In operation, the first thing a SIP client does is to locate a server, typically via DNS. SIP proxies can be easily integrated into firewalls and Network Address Translators. Proposed SIP extensions include specs for user-based call-security management and QoS requirements, as well as the signaling of changes in network conditions.

SIP provides the necessary protocol mechanisms so that end systems and proxy servers can provide call forwarding services, including the equivalent of toll free and 1-900-type feature calls; call-forwarding, no answer; call-forwarding busy; call-forwarding unconditional; called party and calling party number delivery; personal mobility, i.e., the ability to reach a called party under a single, location-independent address even when the user changes terminals. SIP further supports terminal-type negotiation and selection. More specifically, a caller may choose the method for reaching a called party, e.g., via Internet telephony, mobile phone, an answering service, etc.

As may be seen therefore, SIP is a new protocol that provides great promise and expanded capabilities for future generations of telephone systems. Because the SIP protocol requirements are in development, however, certain capabilities and features have not been provided for or defined.

One particular capability that is not being provided but that the present inventors believe to be necessary is that of call monitoring by the various governmental agencies under specified and court approved circumstances in order to combat criminals, terrorists and rascals of all types. More particularly, traditional wiretapping has been effective only when utilized secretly. The traditional PSTN and SS7 networks made anonymous wiretapping an easy feat to accomplish. With data packet networks, such as SIP, anonymous "wiretapping" or call monitoring is not so easy. One reason is that data packets carrying the communication to be monitored are likely to be transmitted through a plurality of nodes by any one of a large plurality of paths. Thus, the potential of data packets forming a communication being transmitted by way of different routes makes it difficult to monitor the communication. If all the packets that form a communication that is to be monitored are routed through a single node that contains monitoring equipment, however, call monitoring becomes detectable because the path defined by the headers appended to the packet would reveal the single node with the monitoring equipment.

An alternative design, of course, is to place call monitoring equipment at every node or at least at every gateway into the data packet network. This solution however, is problematic because of cost and because of the lack of control that a governmental agency might encounter with such widespread distribution of the call monitoring equipment. What is needed, therefore, is a system and process for monitoring select calls in a data packet network that avoids detection, provides adequate control, and is not too expensive.

SUMMARY OF THE INVENTION

To overcome the shortcomings of the prior systems and their operations, the present invention contemplates an apparatus and a method for adding headers to a data packet being transmitted into a data packet network for a communication that is to be monitored, which headers prompt the data packet to be routed to a specified system node that contains monitoring equipment. The specified system node then forwards the data packet to an exit node that strips the headers that indicate that the call was routed for monitoring.

Other aspects of the present invention will become apparent with further reference to the drawings and specification that follow.

BRIEF DESCRIPTION OF THE DRAWINGS

A better understanding of the present invention can be obtained when the following detailed description of the preferred embodiment is considered with the following drawings, in which:

FIG. 1 is an illustration of a communication signal for a SIP data packet formed according to one embodiment of the present invention.

FIG. 2 is an illustration of one embodiment of a communication monitoring header portion of a data packet formed according to the present invention.

DETAILED DESCRIPTION OF THE DRAWINGS

Figure 3:
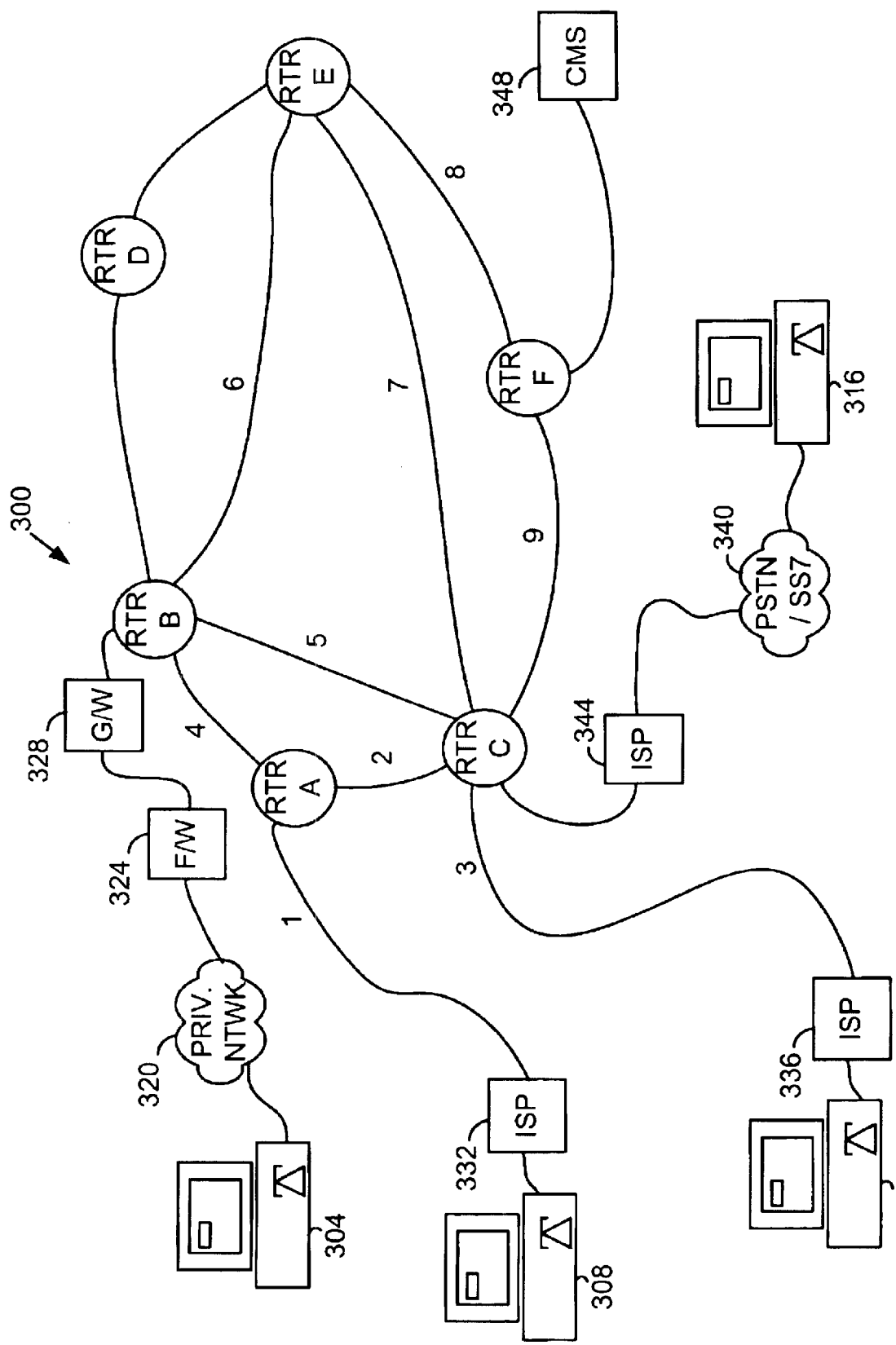
FIG. 3 is a functional block diagram that illustrates a SIP network formed to operate according to one embodiment of the present invention.

FIG. 1 is an illustration of a communication signal for a SIP data packet formed according to one embodiment of the present invention. A signal 100 includes an IP header portion 104 for containing IP layer addressing and routing information. For example, Internet Protocol addresses are configured as four byte numbers that identify network and subnetwork nodes through which the data packets are to be routed for the communication that is transpiring.

A second portion includes a TCP/UDP layer section 108. More specifically, section 108 is for carrying information for OSI layers 4 and 5 that define transport and session parameters. Stated differently, TCP is the transport layer that provides a connection oriented end-to-end protocol. TCP/IP protocols, in combination, provide for communication across interconnected networks and between computers with diverse hardware and various operating systems. The user datagram protocol (UDP) defines the information that enables information to communicate with or reach specific applications within a destination computer. Generally, UDP is a connectionless transport layer protocol.

SIP payload portion 112 is for carrying SIP payload as well as header information as is being defined in RFC 2154 and as will be provided for in subsequent releases of the SIP protocol requirements. Typically, the SIP payload portion 112 will include SIP address information of the calling and called parties as well as defining anyone of the aforementioned SIP signal types and finally, the actual payload data itself.

FIG. 1 further shows that the signal 100 further includes a communication monitoring header 116 that defines monitoring parameters. As is suggested in FIG. 1, the communication monitoring header 116 is formed, in the described embodiment, as a part of SIP payload 112. Communication monitoring header 116 may readily be formed as a separate header as well.

FIG. 2 is an illustration of one embodiment of a communication monitoring header (CMH) portion of a data packet formed according to the present invention. For example, the header portion of FIG. 2 illustrates on arrangement of communication monitoring header 116 of FIG. 1. A communication monitoring header 200 includes a first portion 204 that defines the type of monitoring that is to occur. For example, for some rascals, only the signaling is to be monitored while the communication content is to be transported without monitoring. By monitoring the communication signaling, the data packet source, destination, time and day of the communication may be monitored. For others, the communication signaling as well as the content (payload) is to be recorded and monitored. Typically, payload monitoring requires certain procedural safeguards including, for example, court order or approval. Many different processes for reifying authority to monitor may be implemented and are all included herein.

In addition to defining the type of monitoring that is to occur, a location address portion 208 defines an address of a node that is to perform the communication monitoring. The node address may be merely a SIP address or a combination of SIP, IP, TCP/IP & UDP addresses and signaling information according to system implementation.

A header removal requirement portion 212 defines the requirements for stripping the communication monitoring header information to render the monitoring anonymous. For example, a gateway system from which the data packet exits the data packet network may be formed to automatically strip such headers prior to delivering the communication signals (data packets) to the destination. Additionally, however, it may be desirable to strip the CMH prior to reaching the exit gateway node. In one embodiment of the invention, the header removal requirements portion 212 is for specifying a maximum number of nodes that may process the data packet with the CMH after passing through the select node coupled to or containing the monitoring equipment prior to the header being removed.

FIG. 3 is a functional block diagram that illustrates a SIP network formed to operate according to one embodiment of the present invention. A data packet network shown generally at 300 includes a plurality of user terminals, namely, terminals 304, 308, 312 and 316 are coupled to exchange communication signals in a data packet format by way of data packet network 300. As may be seen, data packet network 300 includes a plurality of routers A–F (for example) and a plurality of communication links coupling the routes to form the data packet network. Each of the user terminals may be formed in any known format that supports voice communications in a data packet format.

As may also be seen, each of the terminals 304–316 is coupled to network 100 through a variety of access portals. More specifically, user terminal 304 is coupled to network 300 by way of a private network 320 (e.g., a corporate LAN), a firewall 324 to control access to the private network 320, and a gateway 328 that provides an interface between the protocols of the data packet network 300 and of the private network 320.

User terminals 308 and 312, on the other hand, are data packet ready and are coupled directly to network 300 by way of Internet Service Provider portals 332 and 336, respectively. Finally, user terminal 316 communicates by way of a modem through a PSTN/SS7 network 340 and then through a ISP gateway 344. Gateway 344 can comprise an ISP providing the interface to the data packet network 300.

In addition to the user terminals 304–316 that may receive communication signals from one of the other user terminals 304–116, a communication monitoring system (CMS) 348 is coupled to router F of network 300. Under the present invention, select communication signals that are to be monitored/recorded are either routed through a router to which the CMS 340 (router F) is coupled so that they may be monitored or are duplicated and transmitted to router F to which the CMS is coupled wherein they are recorded and terminated.

In operation, if the data packets of a communication that is to be monitored were merely routed through the router to which the CMS is coupled, the monitoring could be detected. For example, if all communications to and from user terminal 312 were to be monitored, and if user terminal 308 were to exchange communications with user terminal 312, they would likely be transmitted over communication paths that include links 1-2-3, 1-4-5-3, and perhaps 1-4-6-7-3. If however, careful monitoring indicated that all traffic is being transmitted links 8 and 9 to pass through router F, then a paranoid rascal might validly conclude that her communications are being monitored. Accordingly, the need identified herein is to disguise any routing or transmission that occurs to router F by way of links 8 or 9 to avoid detection by our paranoid rascal.

One observation that may be made from examining network 300 is that many different communication paths may be taken by a series of data packets forming a communication. Thus, the only two ways to completely monitor a communication is to place monitoring equipment or routing logic in all routers (thereby changing their traditional functionality to a certain degree) or to implement detection and routing logic within the gateways to the data packet network 300 wherein communication signals that are to be monitored are either duplicated wherein the duplicated signals are routed to the monitoring equipment or are routed to the monitoring equipment with temporary headers that are stripped before the packets egress from the data packet network 300. While the described embodiment defines the gateways as being the systems in which decisions are made as to whether a communication is to be monitored, such logic may be implemented in any type of node that is assured of being within the communication path.

Figure 4:
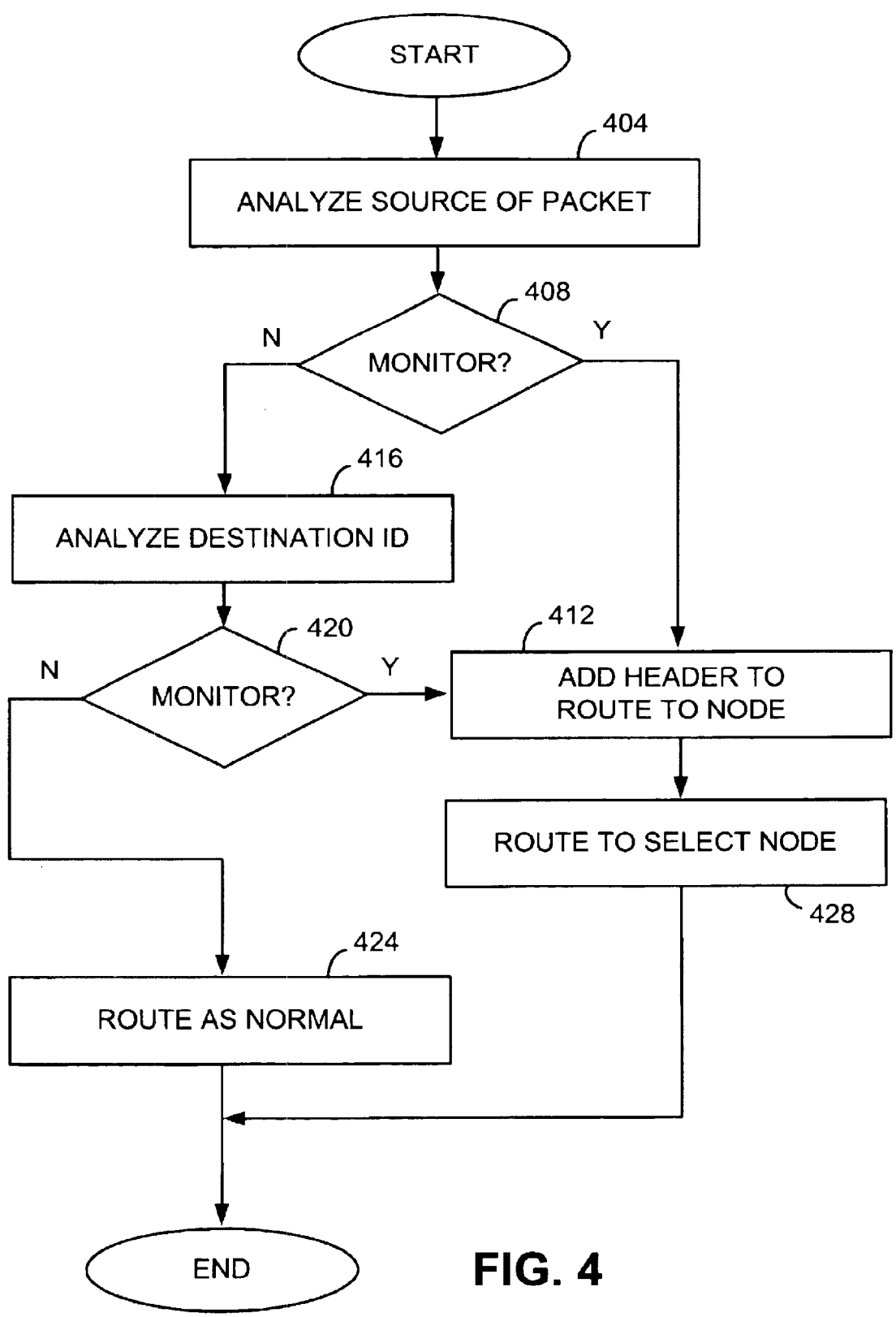
FIG. 4 is a flow chart illustrating a method performed in a gateway system for monitoring communications in a data packet network.

FIG. 4 is a flow chart illustrating a method performed in a gateway system for monitoring communications in a data packet network. Initially, a gateway device, for example, gateway 328 or 336 of FIG. 3 receives a data packet forming at least a part of a communication, which packet is to be routed through a data packet network such as network 300 of FIG. 3. Upon receiving the data packet, the gateway device analyzes and determines the source of the data packet (step 404). Once it determines the source of the data packet, the gateway device determines whether the communication is to be monitored based upon the source of the data packets (step 408). If the communication is to be monitored, the gateway device adds a header to route the data packet to a select node (step 412). The select node is one that includes or is coupled to communication monitoring equipment. The header includes specific parameters that define the monitoring requirements for the communication in addition to defining when the header is to be stripped from the data packet.

If the communication is not required to be monitored based upon the source of the communication (data packet), then the gateway device analyzes the data packet to determine the destination of the data packet (step 416). Once it determines the destination, the gateway determines whether communications to the destination are to be monitored (step 420). If not, the data packet is routed as normal (step 424). If communications for the destination are to be monitored, the gateway device adds a header to route the data packet to a select node (step 412). After step 412, the data packet is routed to the select node for monitoring (step 428).

Figure 5:
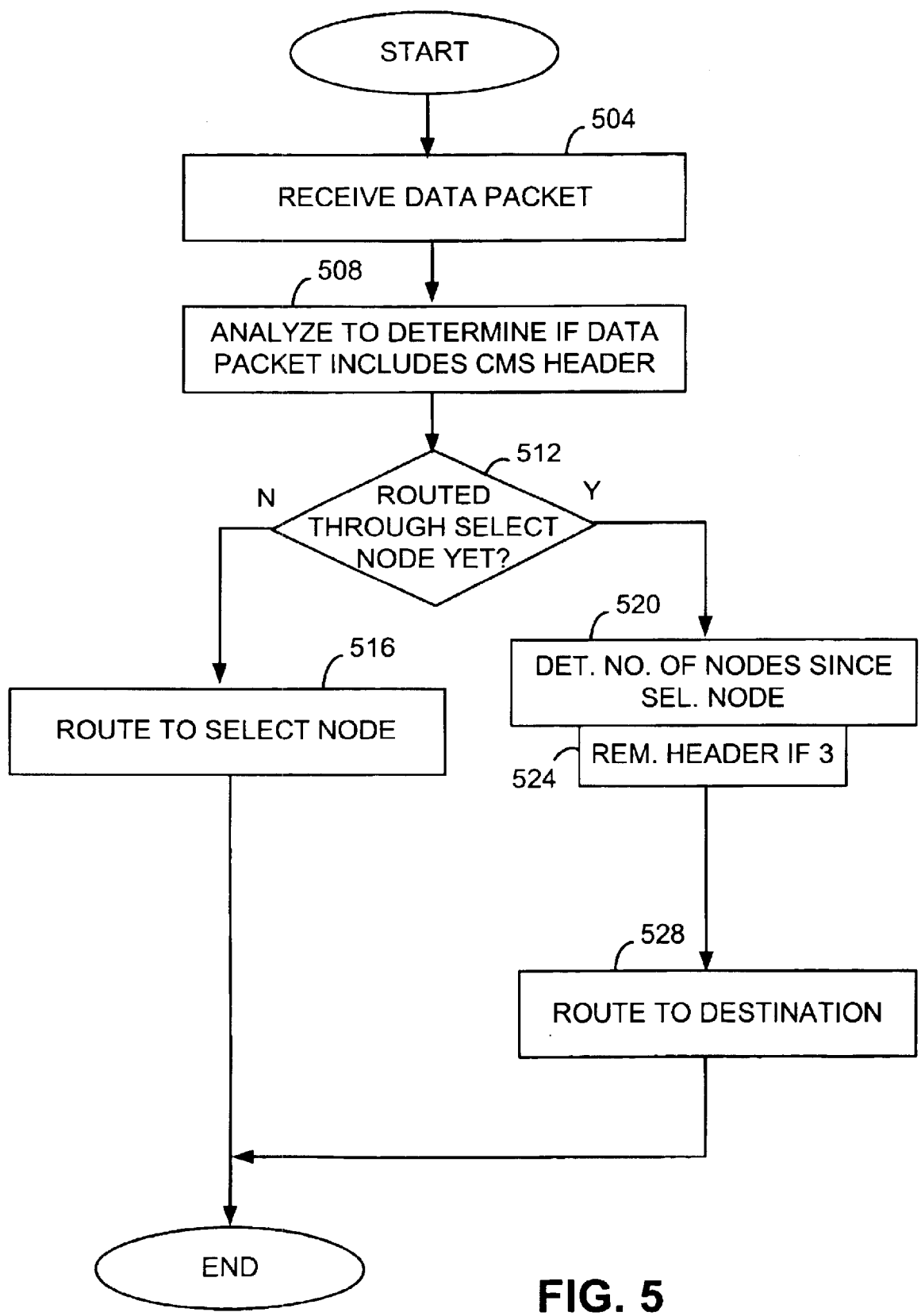
FIG. 5 is a flow chart illustrating a method in a router for removing the CMS header according to one aspect of the present invention.

FIG. 5 is a flow chart illustrating a method in a router for removing the CMS header according to one aspect of the present invention. Initially, a router receives a data packet from another node such as a gateway device or router (step 504). Thereafter, the router analyzes the data packet to determine if it has a communication monitoring system header (step 508) and, if so, whether the data packet has already passed through the select node that monitors the communications (step 512). If the data packet does have a CMS header but has not yet passed the select node with the monitoring equipment, the router routes the data packet to the select node (step 516). If the data packet has already passed through the select node, the router analyzes the path route to determine if it is the third router or node since the data packet passed through the select node (step 520). If so, the router strips the CMS header from the data packet (step 524). In either case, the router then forwards the data packet to the next router towards the final end point of the communication (step 528).

In an alternative method of the present invention, the routers are not formed to strip the CMS header. Only the select node containing the monitoring equipment is formed to strip the CMS header. Thus, once the select node receives the data packet that is to be monitored and it performs the specified monitoring as defined by the parameters within the CMS header, the select node strips the CMS header and forwards the data packet to its end point destination.

Figure 6:
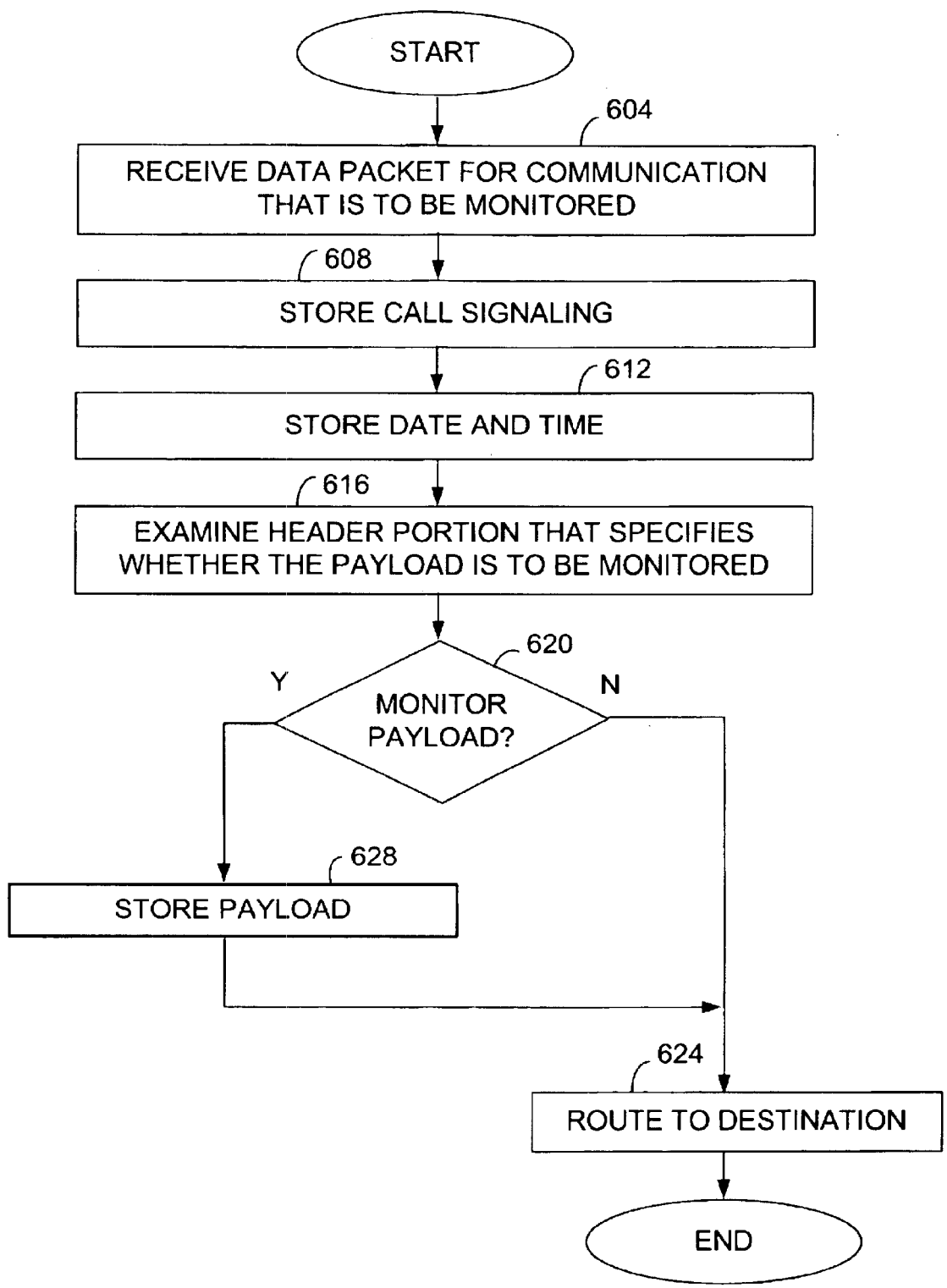
FIG. 6 is a flow chart illustrating a method within a select node containing or coupled to monitoring equipment for monitoring data packets that form a communication according to one embodiment of the present invention.

FIG. 6 is a flow chart illustrating a method within a select node containing or coupled to monitoring equipment for monitoring data packets that form a communication according to one embodiment of the present invention. Initially, the select node receives a data packet that includes a CMS header indicating that the data packet is part of a communication that is to be monitored (step 604). As described before, the communication may require monitoring either because of the source or destination (or both) of the data packets forming the communication are to be monitored.

Once the select node receives the data packet that is to be monitored, it stores the call signaling, and more particularly, the source and destination of the communication (step 608). Additionally, the select node also stores the date and approximate time that the data packet was transmitted (step 612). Thereafter, the select node analyzes the header of the data packet to determine if the payload or data within the data packet is to be monitored (step 616). It then determines whether the payload is to be monitored (step 620). If the payload is not to be monitored, the data packet is then routed towards its end point destination (step 624). If the payload is to be monitored, the payload is stored along with the previously stored call signaling and time stamp information (step 628). Thereafter, the data packet is then routed towards its end point destination (step 624).

Figure 7:
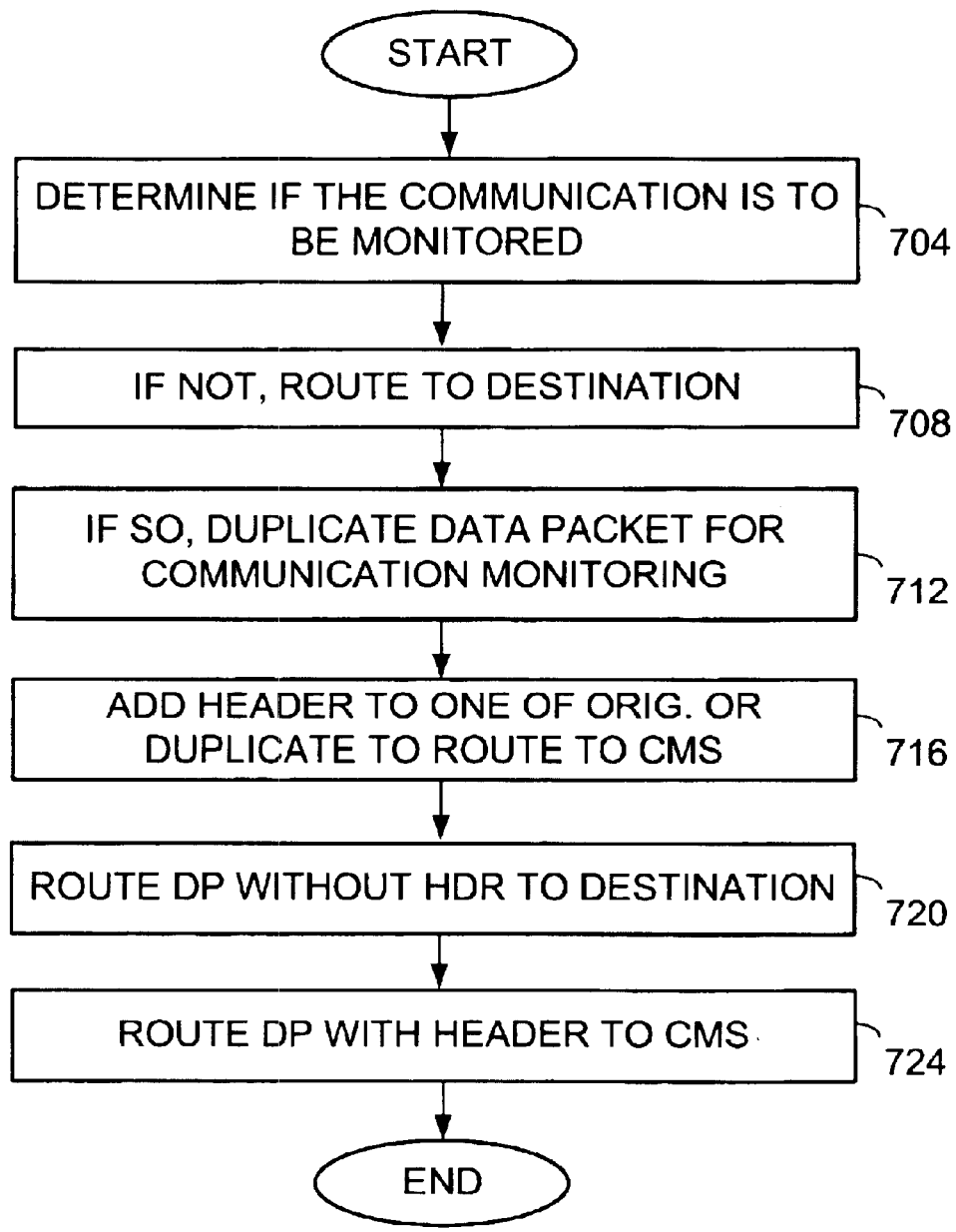
FIG. 7 is a flow chart illustrating an alternative method for monitoring communication in a data packet network according to one embodiment of the present invention.

FIG. 7 is a flow chart illustrating an alternative method for monitoring communication in a data packet network according to one embodiment of the present invention. In general, the alternative method shown in FIG. 7 includes making duplicate copies of data packets that are to be monitored and forwarding those duplicate packets to a node including or coupled to communication monitoring equipment. More specifically, the gateway device, which includes ISP portals, traditional network-to-network gateways, and other similar systems, receives a data packet and analyzes the data packet to determine if it is part of a communication that is to be monitored (step 704).

As described elsewhere, this determination includes analyzing the source and the destination of the communication to see if either one is to be monitored. If neither the source nor the destination is to be monitored, the data packet is routed as normal (step 708). If communications for either the source or the destination are to be monitored, however, then the data packet is duplicated for transmission to a select node such as the previously mentioned CMS for monitoring purposes (step 712).

One of the duplicate data packet and the original data packet is then modified to include a CMS header portion to cause the packet to be forwarded the CMS (step 716). Thereafter, the data packet without the CMS header portion is forwarded to the original destination for the communication (step 720) while the data packet with the CMS header is forwarded to the CMS for monitoring (step 724).

Figure 8:
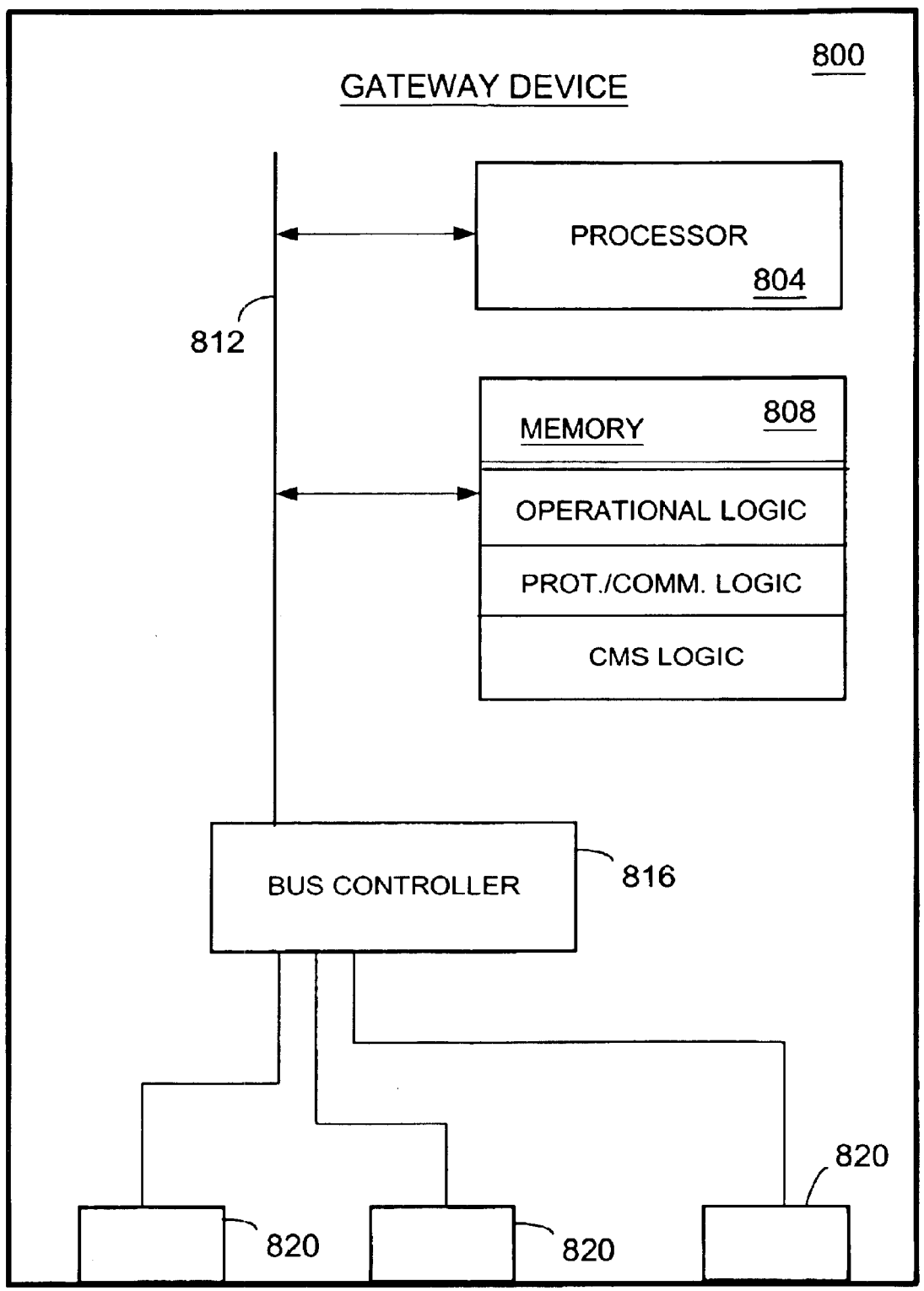
FIG. 8 is a functional block diagram illustrating a gateway device that is forward adding CMS headers to data packets of communications that are to be monitored according to one embodiment of the present invention.

FIG. 8 is a functional block diagram illustrating a gateway device that is for adding CMS headers to data packets of communications that are to be monitored according to one embodiment of the present invention. Referring now to FIG. 8, a gateway device 800 includes a processor 804 that is coupled to receive computer instructions from a memory 808 by way of an internal bus 812. Internal bus 812 is connected to and is controlled by bus controller 816.

Bus controller 816 also is connected to at least one network port 820. Accordingly, processor 804 is able to transmit and receive communication signals through network port 820 by way of bus controller 816. Memory 808 further includes computer instructions that define the operation and operational logic of gateway device 800. It includes, therefore, protocol conversion and communication logic to enable the gateway device 800 to operate in a traditional manner.

Additionally, the computer instructions in memory 808 include the computer instructions that define the operational logic for triggering the communication monitoring that is ultimately performed by a communication monitoring system external to the gateway device 800. The computer instructions, more specifically, either cause a header to be added to cause the data packets that require monitoring to be routed to the CMS or to duplicate the data packets and to add the header to the original or the duplicate data packets according to system implementation to cause one of the duplicate or original data packets to be routed to the communication monitoring equipment while the other is routed to the original destination for the communication. More generally, the computer instructions define the logic described herein described in the methods of the present invention.

The invention described herein is particularly advantageous in that in enables, in a data packet network, and more particularly in a SIP data packet network, for specified communications to be monitored in a way that minimizes or eliminates detection by the monitored individuals or organizations.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. Additionally, the computer instructions may be modified to create permutations of the inventive methods or signals whose differences from what is disclosed and claimed are insubstantial. The described embodiments may be modified in many different ways without departing from the scope or teachings of the invention.

What is claimed is:

1. A gateway system for triggering the monitoring of data packets that form a communication in a data packet network, comprising:
   a storage device for storing computer instructions for generating and transmitting data packets having a communication monitoring header header, which includes communication monitoring parameters;
   a network port for receiving and transmitting the data packets; and
   a processor coupled to communicate with the storage device and coupled to the output port wherein the processor generates the data packets with the communication monitoring header and then transmits the data packets through the network port.

2. The gateway system of claim 1 wherein the communication monitoring header header includes address information of a remote node containing monitoring equipment.

3. The gateway system of claim 1 wherein the communication monitoring header header includes an indication of the type of monitoring that is to take place.

4. The gateway system of claim 3 wherein the type is signaling information only.

5. The gateway system of claim 3 wherein the type is payload information only.

6. The gateway system of claim 1 wherein the communication monitoring header header includes a header stripping parameter that defines, at least partially, when the communication monitoring header is to be stripped from the data packet.

7. The gateway system of claim 1 wherein the communication monitoring header header is appended to the original data packet to cause the original data packet to be transmitted to a specified external node containing monitoring equipment.

8. The gateway system of claim 1 wherein the communication monitoring header header is appended to a duplicate of the original data packet to cause the duplicate data packet to be transmitted to a specified external node containing monitoring equipment.

9. A method in a gateway device to a data packet network for triggering communication monitoring for a plurality of data packets that form a communication, the method comprising:

determining whether a data packet is part of a communication that is to be monitored;

appending a communication monitoring system (CMS) header to the data packet wherein the data packet further includes an IP header with a destination address; and routing the data packet with the appended (CMS) header to a node containing monitoring equipment.

10. The method of claim 9 wherein the determining step includes determining whether a source of the data packet is one that is to be monitored.

11. The method of claim 9 wherein the determining step includes determining whether a destination of the data packet is one that is to be monitored.

12. The method of claim 9 further including the step of determining whether payload information is to be monitored in addition to monitoring signaling information.

13. The method of claim 9 further comprising the step of duplicating the data packet and adding the CMS header to only one of the original or duplicate data packets.

14. The method of claim 9 wherein the CMS header includes an address of a node containing monitoring equipment.

15. The method of claim 9 wherein the CMS header includes an indication of the type of monitoring that is to occur.

16. The method of claim 9 wherein the CMS header includes a header stripping parameter.

17. A method for routing data packets in a data packet network, comprising:

determining that an original data packet is part of a communication that is to be monitored;

duplicating the original data packet and forwarding one of the original and the duplicated data packets to a node containing monitoring equipment; and forwarding the other of the original and the duplicated data packets to a specified destination.

18. The method of claim 17 wherein the method is performed in a gateway device.

19. The method of claim 17 wherein the method is performed in a portal to the data packet network.

20. The method of claim 17 wherein the one of the original and duplicated data packets that is forwarded to the node containing monitoring equipment is modified to including monitoring parameters within a header.

* * * * *